United States Patent Office 2,767,077
Patented Oct. 16, 1956

2,767,077

PROCESS FOR DESILICONIZING AND DESULPHURIZING PIG IRON

René Perrin, Paris, France, assignor to Societe d'Electro-Chimie d'Electro-Metallurgie et des Acieries Electriques d'Ugine, Paris, France No Drawing. Application January 15, 1954,
Serial No. 404,375

Claims priority, application France May 6, 1953

4 Claims. (Cl. 75—52)

This invention relates to a process for desiliconizing and desulphurizing pig iron. The present application is an improvement or modification of the process disclosed in my parent application, Serial No. 371,706, filed July 31, 1953.

The parent application discloses a process which comprises mixing molten pig iron with a basic oxidizing slag containing a basic element such as lime, magnesia, barium oxide or soda, an oxidizing element such as iron oxide or manganese oxide, and, if desired, a flux, for example, fluorspar. The amount of slag used is so proportioned as to oxidize the amount of silicon which it is desired to remove from the pig iron. The silicon of the pig iron is oxidized to silica which enters the basic slag. The mixing is carried out until most of the iron oxide and manganese oxide of the slag is reduced to iron and manganese, thereby converting the slag to a reducing slag capable of removing sulphur from the pig iron. The intermixing of the pig iron and slag is further continued for a time sufficient for the desulphurizing elements of the slag to lower the sulphur content of the pig iron. The composition of the initial slag is so selected that, after the enrichment in silica, the slag remains melted on the one hand, and has a desulphurizing character on the other hand.

The process of the parent application may be carried out by charging the molten pig iron and slag into a rotatable apparatus and rotating the apparatus at a speed of 10–40 turns per minute, for example. Preferably, the rotatable apparatus has a non-cylindrical cross section, for example an oval cross section, or is provided with vanes or steps so that in the course of each rotation the pig iron falls back on the slag and thus causes a strong intermixing which causes the pig iron and slag to come very quickly to equilibrium.

According to the present invention, instead of charging at the beginning of the operation a slag containing all the iron and manganese oxides required for oxidizing the desired amount of silicon, one charges into the apparatus containing the molten pig iron a basic slag which is free from these oxides or contains only a part of these oxides which would be necessary to oxidize the amount of silicon desired to be removed from the pig iron. Instead of using previously formed slags, I may use the slag forming elements and form the slag during the operation. Whether slag or slag forming elements are employed, the molten pig iron is contacted or blown with oxygen-containing gas during the first part of the operation. If the slag contains no appreciable amount of iron or manganese oxides, the quantity of oxygen contained in the oxygen-containing gas will be substantially equivalent to that required for oxidizing to silica the amount of silicon which it is desired to eliminate from the pig iron. The amount of oxygen in the gas will be less if the slag contains an appreciable amount of iron or manganese oxides.

The slag or the slag forming elements may be used in the solid state and may be preheated or not. Silicon, manganese, and iron of the pig iron are oxidized and an important amount of heat is emitted during the first part of the operation wherein the molten pig iron is blown or otherwise contacted with oxygen. The oxides so formed scorify the slag elements previously added into the bath, i. e., the elements of a basic slag capable of removing sulphur from the pig iron. The introduction of oxygen into the pig iron is then stopped and the second part of the operation is carried out. At the end of the introduction of oxygen-containing gases, the slag is composed essentially of silica (and flux), of bases and of iron and manganese oxides. Also, at the end of this period, the amount of silicon which has been oxidized may be somewhat less than the amount which will have been oxidized at the end of the second period. In the second part of the operation, the molten pig iron is violently intermixed with the slag formed by the slag forming elements added and the silica, iron oxide and manganese oxide resulting from oxidation of the silicon, iron and manganese of the pig iron. During this portion of the operation, silicon remaining in the pig iron reduces the greater part of the iron and manganese oxides so that at the end of the second period the elimination of the silicon corresponds substantially to the quantity of all the oxygen introduced, i. e., the oxygen introduced in the form of a gas and the oxygen introduced in the form of an oxide. The slag becomes at the same time progressively desulphurizing if the quantity and composition of the initial slag (or of the slag forming elements) have been properly chosen so that in extending the operation one obtains an important lowering of the sulphur content of the pig iron.

The introduction of oxygen-containing gas into the bath of pig iron during the first part of the operation can be made by any known means, for example, when using a rotatable apparatus, by injection through a nozzle, which enables one to properly inject a determined amount of oxygen which is desired. On the other hand, one can simply leave an opening in the apparatus. So long as the pig iron contains silicon, carbon is practically not oxidized and, accordingly, there is no substantial emission of carbon monoxide. Therefore, the absorption of oxygen by the pig iron causes a new admission of oxygen into the apparatus. However, this method of simply leaving an opening in the apparatus renders it more difficult to introduce a predetermined weight of oxygen. After a predetermined weight of oxygen has been introduced into the pig iron, the injection of oxygen is stopped or the furnace opening is closed. The essential result to be obtained is that at the end of the second part of the operation, i. e., after most of the iron and manganese oxides have been reduced by silicon, the slag is thoroughly molten and has a desulphurizing character. With this object in mind, one predetermines the nature and the quantity of the slag or of the slag forming elements which are charged into the apparatus in order to obtain the desired result.

In order to do this, the composition of a final slag known to be suitable for desulphurizing pig iron and which is molten at the final temperature of the pig iron is selected. This slag must contain silica. One determines on the other hand the amount of silicon to be eliminated from the pig iron. This amount determines substantially the weight of oxygen to be introduced into the bath, either in the form of oxygen-containing gas or in the form of iron and manganese oxides if these oxides are to be present in the initial slag. A very slight excess of oxygen is necessary, for the final slag always contains small quantities of FeO and MnO.

If it is assumed in a first approximation that all the silica of the final slag will come from the oxidation of silicon, the silica content of the final slag selected is determined by the weight of silicon to be eliminated from the pig iron and the weight and analysis of the slag or of the various slag forming elements of the initial slag to be charged with the pig iron. In practice, in order not to have to charge very pure raw materials, which are expensive, one uses initial slag or slag elements which contain small quantities of silica. This fact is taken into account in calculating the weight and composition of the initial slag or slag forming elements.

One can inject into the apparatus air, air enriched in oxygen or practically pure oxygen. These may be used separately or mixed with each other or with gases, such as $CO_2$ or $H_2O$, which are partially reducible by the silicon, manganese or iron, thus giving off a part of their oxygen.

The selection of the oxygen-containing gas or mixtures thereof is essentially dictated by the final temperature of the pig iron which is desired. It is relatively easy to calculate the total emission of heat which is produced in the apparatus because the result is practically the same as if it were only the silicon which had burned or reduced $CO_2$, $H_2O$ and the oxides of iron and manganese if the initial slag contained such oxides. It is also easy to calculate the heat absorbed by the gases, that used in heating the pig iron and that used in heating and melting the slag.

The temperature of the pig iron during the operation also can be controlled by the introduction into the apparatus of a certain quantity of iron or manganese oxides in free or combined form in the slag or the slag forming elements. In the case of such additions, the amount of oxygen to be introduced in the gaseous form will be less than that above indicated, because of the oxygen introduced in the form of oxides. One must take into account the fact that the reduction of the oxides by silicon emits less heat than the combustion of silicon by oxygen-containing gas. One disposes thus of a number of important factors which enable, in any particular case, to obtain the triple result of removing a predetermined quantity of silicon from the pig iron, removing a substantial amount of sulphur from the pig iron and producing molten pig iron having a predetermined and substantially constant temperature. All the elements of the problem can be approximately previously calculated when knowing the specific heat, emitted heat, desulphurizing power of the various slags, etc. A small number of preliminary tests are then sufficient to determine all of the elements required for carrying out an industrial operation.

The present process has the advantage over the process of the parent application of emitting a larger quantity of heat for the same quantity of silicon removed from the pig iron. This results in two advantages:

(1) One can use more easily a solid initial slag in the cold or preheated state, or even simply the separate elements of the slag.

(2) A higher final temperature of the pig iron and slag can be obtained which enables one to use a final slag melting at a higher temperature. This in turn results in two advantages:

(a) The final slag may be more basic and thereby possess a higher desulphurizing power.

(b) The final slag can be richer in silica and can contain less elements such as $Al_2O_3$ or $TiO_2$ which lower the melting points of slags containing silica and lime and under these conditions, for the same elimination of silicon from the pig iron, one can use a smaller quantity of slag or slag elements.

As above indicated, an excellent method for carrying out the present invention consists in charging molten pig iron and the elements of the initial slag into a rotatable apparatus which, when rotated, insures a proper contact between pig iron and slag. During the first part of the operation, oxygen-containing gas is blown into the bath of pig iron. The introduction of oxygen-containing gas is stopped and then during the second part of the operation, the apparatus is rotated to intimately mix the pig iron and slag. However, other means than such rotating furnaces may be used so long as they insure a proper contact and preferably a strong intermixing of slag and metal in the second part of the operation which results at the end of the operation in the desired equilibrium of slag and metal. One can also carry out the two parts of the operation in two separate receptacles. For example, oxygen-containing gas may be blown into a ladle of pig iron. The pig iron may have added to it either before, during or after the blowing, the initial slag or the elements for forming the initial slag. The blowing of the pig iron with oxygen-containing gas is stopped and then the pig iron and slag are poured into an apparatus which is capable of providing efficient intermixing of the slag and metal and such intermixing is effected. In a process using two receptacles, one may blow the pig iron with oxygen-containing gas in one receptacle or otherwise contact the pig iron with oxygen-containing gas in that receptacle and thereafter pour the pig iron and slag resulting from oxidation of silicon, manganese and iron in the first receptacle into a second receptacle containing a suitable basic slag or slag forming elements. In carrying out the process, one may employ any means for intermixing now known, for example, intermixing by blowing gas, employing a rotating or oscillating receptacle or by electromagnetic intermixing.

The common features involved in any of these processes are the introduction of oxygen-containing gas in any form (including $CO_2$ and $H_2O$) into a bath of pig iron in the quantity required for oxidizing the amount of silicon which one desires to remove from the pig iron (taking into account the oxygen added in the form of manganese oxide or iron oxide, if any), shutting off the introduction of oxygen-containing gas and intimately mixing, under practically non-oxidizing conditions, the blown pig iron, the slag produced by such blowing, and a basic slag, until most of the manganese and iron oxides in the slag are reduced, the final slag being in a quantity and of an analysis as to have an appreciable desulphurizing power toward pig iron.

Experience has shown that in proceeding according to this invention, except for silicon and sulphur, the analysis of the pig iron may remain practically unaltered, particularly the carbon, manganese and phosphorus contents. Because of this, one can transfer to a refining furnace, such as a converter, open hearth furnace or any other type of refining furnace, a pig iron of regular analysis corresponding, except for silicon and sulphur, to that of the pig iron produced, thus insuring a regular control of the refining operation in the furnaces used for converting pig iron into steel.

The following example further illustrates my invention:

*Example*

Fifteen metric tons of molten pig iron having the following composition were introduced into an apparatus capable of being rotated to produce a strong intermixing of the charge:

|   | Percent |
|---|---|
| C | 3.44 |
| Si | 0.832 |
| Mn | 0.750 |
| S | 0.041 |
| P | 1.868 |

140 kgs. of lime, 10 kgs. of fluorspar and 60 kgs. of grey bauxite free from iron and containing about 78% alumina and 20% of silica were added to the bath.

About 70 kgs. of practically pure oxygen were blown into the bath. The blowing was stopped and then the apparatus was rotated for three minutes so as to intimately intermix the pig iron with the slag which had been formed in the course of the blowing, from the oxidized elements of the pig iron, and the added lime, fluorspar and bauxite.

After this intermixing, the slag overfloating the pig iron bath had the following composition:

| | Percent |
|---|---|
| $SiO_2$ | 34.4 |
| $Al_2O_3$ | 11 |
| CaO | 43 |
| FeO | 1.4 |
| MnO | 1.5 |
| $CaF_2$ | 4.8 |
| S | 1.15 |

The pig iron contained only 0.02% of sulphur. The silicon content had been lowered to 0.514. The contents of the other elements had not appreciably been altered.

In the claims, the term "slag" is intended to include slag elements which, when melted, form slag.

The invention is not limited to the preferred embodiment but may be otherwise employed or practiced within the scope of the following claims.

I claim:

1. A process for desiliconizing and desulphurizing pig iron, which comprises introducing an oxygen-containing gas into contact with molten pig iron to oxidize silicon, iron and manganese of the pig iron to silica, iron oxide and manganese oxide, stopping the introduction of said gas, intimately mixing said pig iron under substantially non-oxidizing conditions with a slag which contains said oxides, is basic and contains an element of the group consisting of lime, magnesia, barium oxide and soda, and also a flux, until silicon remaining in the pig iron reduces most of the iron and manganese oxides in the slag to iron and manganese, and continuing mixing said pig iron and said slag under substantially non-oxidizing conditions until the sulphur content of the pig iron is substantially reduced.

2. A process according to claim 1, wherein molten pig iron is contacted with oxygen-containing gas by blowing said gas into the pig iron.

3. A process for desiliconizing and desulphurizing pig iron, which comprises introducing into a container a charge of molten pig iron and solid slag, said slag being a basic slag containing an element of the group consisting of lime, magnesia, barium oxide and soda, and also containing a flux, blowing the charge with an oxygen-containing gas to oxidize silicon, iron and manganese of the pig iron into their oxides which unite with said basic slag and flux, stopping said blowing intimately mixing said pig iron, slag and flux under substantially non-oxidizing conditions until silicon remaining in the pig iron reduces most of the iron and manganese oxides in the slag to iron and manganese, and continuing mixing said pig iron and said slag under substantially non-oxidizing conditions until the sulphur content of the pig iron is substantially reduced.

4. A process according to claim 1, wherein the amount of slag used and the proportions of desulphurizing elements and flux are such that after the slag has reacted with the quantity of silica corresponding to the silicon to be eliminated from the pig iron, the final resulting slag has a desulphurizing character.

References Cited in the file of this patent

UNITED STATES PATENTS

| 2,288,836 | Perrin | July 7, 1942 |

FOREIGN PATENTS

| 723,283 | Germany | Aug. 4, 1942 |
| 899,743 | France | June 8, 1945 |

OTHER REFERENCES

Metallurgy of Iron and Steel, 3rd ed., pages 106 and 107. Edited by Stoughton. Published in 1923 by the McGraw-Hill Book Co., N. Y.